United States Patent [19]

Evans

[11] 4,327,984
[45] May 4, 1982

[54] LIGHT FILTER ASSEMBLY FOR PHOTOGRAPHIC CAMERA

[76] Inventor: Karl K. Evans, Box 3122, Huntington Park, Calif. 90255

[21] Appl. No.: 287,522

[22] Filed: Jul. 27, 1981

[51] Int. Cl.³ .......................... G03B 9/02; G03B 11/00
[52] U.S. Cl. ...................................... 354/270; 354/295
[58] Field of Search ............... 354/295, 296, 75, 154, 354/270, 219, 64

[56] References Cited

U.S. PATENT DOCUMENTS 2,535,591  12/1950  Mosman .............................. 354/219
4,168,897   9/1979  Gates ................................ 354/64 X

FOREIGN PATENT DOCUMENTS 478539  1/1938  United Kingdom ................ 354/270
486839  6/1938  United Kingdom ................ 354/270

Primary Examiner—Donald A. Griffin
Attorney, Agent, or Firm—Dominick Nardelli

[57] ABSTRACT

A light filter assembly is disclosed for a photographic camera which filter is composed of at least two light transmitting elements in combination with the lens of the camera. The elements are mounted in an assembly which in turn is capable of being mounted onto the end of the lens structure so that light entering the camera must be transmitted through both elements in turn. The element remote from the lens is made of a light transparent material while the element adjacent the lens is a polarizing filter. The assembly includes means whereby the transparent element can be stressed so that a "rainbow of colors" pattern can be superimposed on the image formed on the film. As an alternative embodiment, another polarizing filter is mounted in front of the transparent element.

10 Claims, 2 Drawing Figures

LIGHT FILTER ASSEMBLY FOR PHOTOGRAPHIC CAMERA

FIELD OF THE INVENTION

This invention relates to a light filter for cameras or more particularly for a light filter that can produce a rainbow of colors. In this application, the word "camera" includes all devices having a lens for gathering light rays from an object and focusing the light rays at or onto an image plane.

BACKGROUND OF THE INVENTION

Photoelasticity is well known as a technique for stress and strain analysis. The photoelastic method is based upon the unique property of some transparent material, particularly certain plastics that enable the use of structural members made of such materials to visually display stress patterns in the member. When a photoelastic member is stressed and a ray of polarized white light enters the member, the white light is believed to be divided into two component waves, each with its plane of polarization parallel to one of the principal planes of stress and strain. The white light travels along these two planes with different velocities depending upon the magnitude of the stress in the material. The light waves then emerge from the model in two planes with a phase difference so that when these waves are brought together at a polarizing panel, which functions to bring the waves into a common plane so that optical interference can take place, the resulting optical interference shows up as a "rainbow of colors" on the model, i.e., a pattern of colored bands or isochromatic fringes.

Heretofore, these stress or strain patterns of a rainbow of colors were used to analyze structural strength in a model of the structure. I have discovered that by placing a polarizing filter in front of a camera lens and a sheet of plastic material which has been stressed in front of the polarizing filter, I can produce, at the image plane behind the lens, color pictures with a "rainbow of colors" superimposed thereon.

OBJECTS OF THE INVENTION

An object of this invention is to provide a light filter for a camera which superimposes a "rainbow" over a color picture.

Another object of this invention is to provide a light filter for a camera consisting of a polarizing filter and a stressed sheet of plastic, and means for rotating the polarizing filter with respect to the plastic sheet.

Another object of this invention is to provide a light filter for a camera consisting of two polarizing filters with a stressed sheet of plastic disposed therebetween with means for rotating at least one of the polarizing elements with respect to the plastic sheet.

These and other objects and features of advantages will become more apparent after one studies the following description of the preferred embodiment of my invention together with the appended drawings.

BRIEF DESCRIPTION OF THE INVENTION

DETAILED DESCRIPTION OF THE DRAWING

Figure 1:
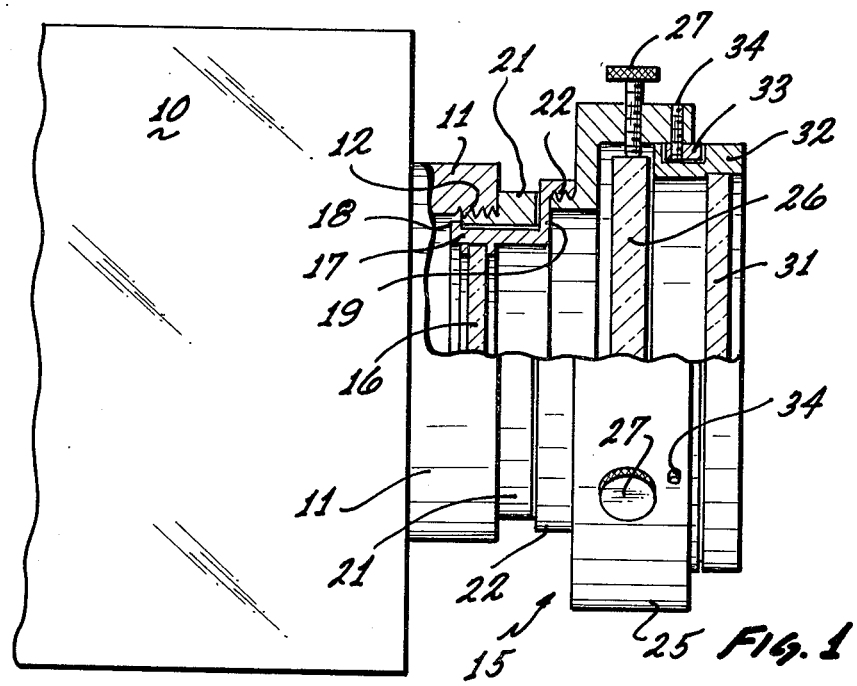
FIG. 1 is a side elevation of a typical camera with my novel light filter mounted thereon which is shown in partial section.
Figure 2:
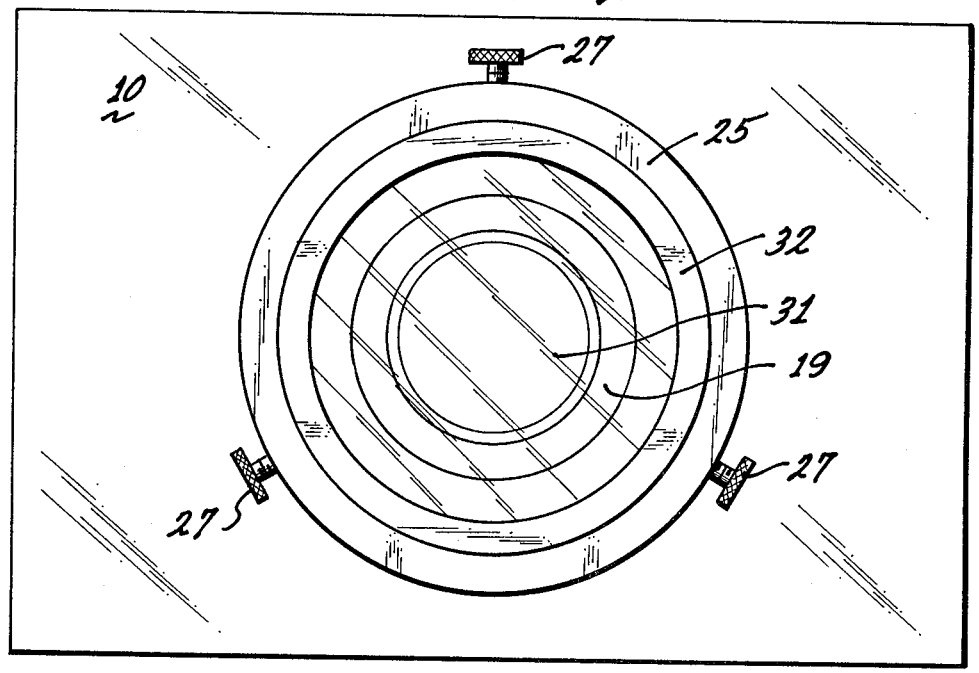
FIG. 2 is a front view of the assembly of FIG. 1.

Referring to the drawing, the standard camera is schematically indicated as item 10 having a lens structure 11 with suitable mounting means thereon so that light filters can be attached and removed thereon. Since this is a camera, the lens structure gathers light rays that travel from right to left as viewed in FIG. 1. The mounting means on the camera 10 herein are shown as, for example, internal threads 12.

My novel light filter assembly is mounted to the internal threads 12 and is comprised of a polarizing panel 16 suitably mounted internally within a sleeve 17 in a fixed relationship thereto. Sleeve 17 preferably has outwardly turned flanges 18 and 19 on either end with a mounting nut 21 freely mounted therebetween so that nut 21 rotates with respect to sleeve 17. Nut 21 has external threads which engage internal threads 12. Made integral with flange 19 is an internal threaded section 22 which in turn is threaded onto a stress ring 25 which is preferably shaped as shown so that a transparent disc 26 can be mounted therein and held, for example, by three thumb screws 27 disposed radially in the stress ring 25. The screws 27, besides holding the disc 26 in place, are also used to vary the stress and strain patterns within the disc 26. Disc 26 is preferably made of a transparent polycarbonate resin, although other photoelastic plastic materials can be used, and of sufficient thickness to withstand compression forces in the plane placed thereon by screws 27. As an alternative, one skilled in the art could use screws 27 to place tension forces within the disc 26. One understands that if item 10 is an enlarger, the image plane would be located exterior of item 10, because light rays would be now traveling from left to right as viewed in FIG. 1.

The description, of the novel device up to this point, will produce a rainbow-like effect at the image plane or on the negative of the picture taken with the camera or the slide of an enlarger. If one is using, for example, a single lens reflex type camera 10 where one can view the object through the lens 11, one can see the rainbow of colors formed by my filter through the viewer. By rotating one or more of the screws 27, the rainbow of colors can be moved with respect to the object. Also by rotating stress ring 25 with respect to the camera, the rainbow of color can be moved with respect to the object.

To enhance the rainbow-like effect, I have mounted another polarizing panel 31 in front of disc 26, preferably so that panel 31 can be rotated with respect to disc 26. The mounting is accomplished by providing a U-shaped band 32 as shown with a slip-ring 33 mounted externally within the groove formed by the U-shape in the band 32. By use of a plurality of set screws like screw 34 radially disposed in stress ring 25 the slip-ring 33 can be fixed to the stress-ring 25 allowing one to rotate polarizing panel 31. Again, by viewing through the view-finder, one can move or enhance the effect of the rainbow-like light pattern at the image plane or on the negative.

Having described the preferred embodiment of my invention, one skilled in the art after studying the above description of the preferred embodiment, can devise other embodiments without departing from the spirit of my invention. Therefore, my invention is not to be considered limited to the disclosed embodiment, but includes all embodiments coming within the scope of appended claims.

I claim:

1. In combination:
a camera having a lens structure;
a light filter assembly mounted onto said lens structure;
said light filter assembly comprising;
a first polarizing panel disposed in front of said lens structure;
a transparent disc, mounted parallel to said first polarizing panel;
first means for straining and deforming said transparent disc.

2. The combination of claim 1, wherein:
said first means is limited to deforming said disc radially and;
said first polarizing panel is disposed between said disc and said lens structure.

3. In the combinatin of claim 2 wherein:
second means are provided to rotate said first polarizing panel with respect to said lens structure.

4. The combination of claim 2 wherein:
a second polarizing panel disposed on the opposite side of said transparent disc than said first polarizing panel.

5. The combination of claim 4 wherein:
said first polarizing panel is disposed between said disc and said lens structure;
third means are provided to rotate said second polarizing panel with respect to said first polarizing panel.

6. The combination of claim 5 wherein:
said second means are provided to rotate said first polarizing panel with respect to said lens structure.

7. The combination of claim 6 wherein:
a stress ring is disposed about said disc;
at least one threaded hole is provided in said stress ring and is disposed radially therein;
a screw threaded into said threaded hole so that the inner end is capable of contacting the periphery of said disc.

8. The combination of claim 7 wherein:
a sleeve is provided so that said first polarizing panel is mounted therein;
said sleeve and said stress ring are fixedly mounted together.

9. In the combination of claim 1 wherein said first means comprises:
a stress ring disposed about said disc;
at least one threaded hole in said stress ring disposed radially therein;
a screw threaded into said threaded hole so that the inner end is capable of contacting the periphery of said disc.

10. The combination of claim 9 wherein:
a sleeve is provided so that said first polarizing panel is mounted therein;
said sleeve and said stress ring are fixedly mounted together.

* * * * *